Sept. 30, 1941.  S. J. SAVITZ ET AL  2,257,430

FRUIT JUICE EXTRACTOR

Filed Feb. 6, 1939

INVENTORS

Samuel Joseph Savitz
Sarah Weissblatt Savitz
BY
Augustus B. Stoughton
ATTORNEY.

WITNESS:

Patented Sept. 30, 1941

2,257,430

UNITED STATES PATENT OFFICE 2,257,430

FRUIT JUICE EXTRACTOR

Samuel Joseph Savitz and Sarah Weissblatt Savitz, Philadelphia, Pa.

Application February 6, 1939, Serial No. 254,816

3 Claims. (Cl. 146—3)

Objects of the present invention are to avoid clogging the strainer and to provide a supply of strained juice in advance of pouring, to divorce the straining operation from both the pouring and squeezing operations and to strain the juice in its downward flow, and in general to provide a fruit juice extractor which can be easily manufactured by molding when desired and which is efficient in operation.

Other objects of the invention will appear from the following description at the end of which the invention will be claimed.

Generally stated, the invention comprises a high level fruit juice extracting compartment and a low level strained juice pouring compartment with a removably mounted folded strainer between the two. One part of the strainer is substantially horizontal and the other part of the strainer is substantially vertical so that juice flows down through the horizontal part and is strained and so that the other part of the strainer catches objects strained from the juice.

The invention also comprises the improvements to be presently described and finally claimed.

Figure 1:
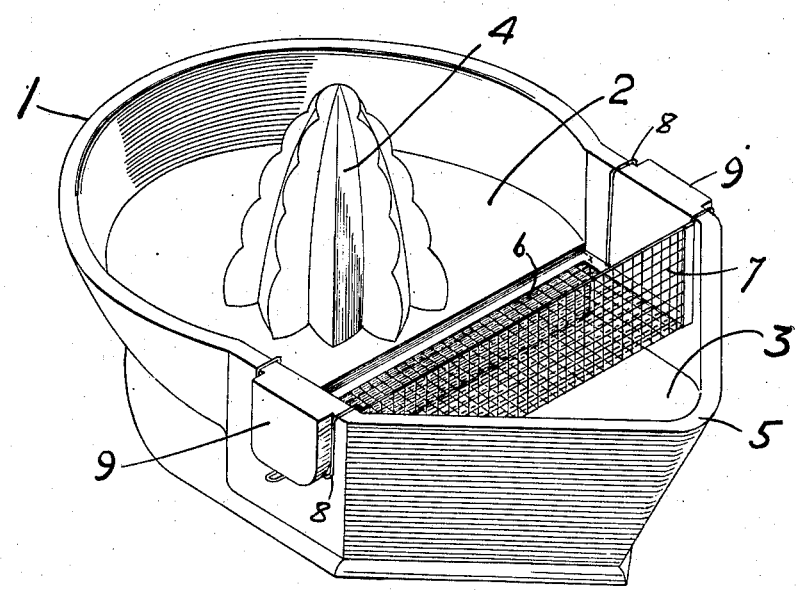
Figure 2:
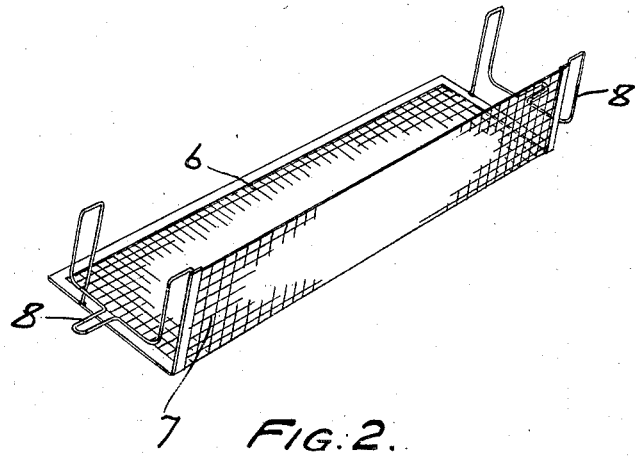

In the following description reference will be made to the accompanying drawing forming part hereof and in which, Figure 1 is a perspective view of a fruit juice extractor embodying features of the invention; and Figure 2 is a similar view of the strainer.

Referring to the drawing, 1 indicates an open top receptacle having intercommunicating high and low level squeezing and pouring compartments 2 and 3 defined by unobstructed floors with a declivity between them. 4 indicates a reamer immovably fixed centrally of the unobstructed floor of the high level compartment 2. 5 indicates a spout for the pouring compartment 3. There is a folded strainer demountably mounted at the declivity with one portion 6 arranged generally horizontally slightly below the plane of the floor of the high level compartment and overhanging a portion of the low level compartment. The function of this part 6 is to strain the juice as it flows downward from the high to the low level. The other part 7 of the strainer is in upright position and it retains objects strained from the juice passing down through the part 6. The strainer itself is demountably mounted so that it can be readily detached for cleaning and then attached. One way to accomplish this is shown in the drawing. 8 are wire hooks arranged at the ends of the strainer and they engage over the top of the sides of the extractor and are shown to detachably engage projections 9 provided on its exterior. At the edge of the floor of the compartment 2 opposite the pouring spout 5 there is shown a ledge upon which the edge of the horizontal part of the strainer is supported.

The floor of the compartment 2 slopes downward toward the strainer so that juice extracted by the reamer flows forward through the part 6 of the strainer and downward into the compartment 3 which is a reservoir of strained juice and from the compartment 3 the juice is poured by the spout 5. Any objects strained from the juice are retained by the upright portion 7 of the strainer and may not enter the juice reservoir 3. It is an advantage that the juice is strained before it enters the compartment 3 so that the straining operation is quite independent of both the squeezing operation and the pouring operation.

While reference has been made to the strainer as being removably mounted, it can, if desired, be made a fixed part of the structure.

It will be obvious to those skilled in the art to which the invention relates that modifications may be made in details of construction and arrangement and matters of mere form without departing from the spirit of the invention which is not limited to such matters or otherwise than the prior art and the appended claims may require.

We claim:

1. A fruit juice extractor comprising an open top receptacle having intercommunicating high and low level squeezing and pouring compartments defined by unobstructed floors with a declivity between them, a reamer immovably fixed centrally of the unobstructed floor of the high level compartment and a folded strainer demountably mounted at the declivity with one portion arranged horizontally below the plane of the floor of the high level compartment and overhanging a portion of the low level compartment to strain the juice as it flows down from the high to the low level and with the other portion in upright position to retain objects strained from the juice on the first mentioned portion of the strainer.

2. An open top receptacle having intercommunicating high and low level squeezing and pouring compartments defined by unobstructed floors of which the floor of the squeezing compartment slopes downward toward the pouring compartment, a reamer immovably fixed on the unobstructed floor of the high level compartment, and a folded strainer with one portion arranged with its upper surface parallel to and slightly below said high level and to overhang a portion of said low level compartment and with the other portion arranged upright at the overhanging edge of the first portion and disposed opposite to said reamer.

3. A fruit juice extractor, comprising, an open top vessel having solid high and low level floors, a reamer at the high level floor and a folded rectilinear straight screen of which one part has its upper surface parallel to but at a lower level than the high level floor with a step therebetween and overhangs the lower level floor and of which a portion is arranged in upright position and is located at the edge of the first portion remote from the high level floor.

SAMUEL JOSEPH SAVITZ.
SARAH WEISSBLATT SAVITZ.